United States Patent [19]
Dadel et al.

[11] Patent Number: 5,482,148
[45] Date of Patent: Jan. 9, 1996

[54] SYSTEM FOR TRANSMISSION OVERSPEED AND HORSEPOWER LIMIT PROTECTION

[75] Inventors: Martin R. Dadel, Plainfield; Charles F. Long, Pittsboro, both of Ind.

[73] Assignee: General Motors Corporation, Detroit, Mich.

[21] Appl. No.: 296,559

[22] Filed: Aug. 26, 1994

[51] Int. Cl.⁶ .............................. F16D 67/04; F16D 57/02
[52] U.S. Cl. ................ 192/12 A; 192/4 B; 192/103 FA; 188/291
[58] Field of Search .................................. 192/4 B, 12 A, 192/103 FA; 188/291, 296

[56] References Cited

U.S. PATENT DOCUMENTS

| | | | |
|---|---|---|---|
| 4,238,020 | 12/1980 | Nerstad et al. | 192/103 FA |
| 4,321,990 | 3/1982 | Koch, Jr. | 192/12 A X |
| 4,324,387 | 4/1982 | Steinhager | 188/291 X |
| 4,768,401 | 9/1988 | Fuehrer et al. | 192/4 B X |
| 4,981,198 | 1/1991 | Klemen et al. | 192/4 B X |

*Primary Examiner*—Richard M. Lorence
*Attorney, Agent, or Firm*—Donald F. Scherer

[57] ABSTRACT

The present invention is directed to a retarder control system for protection against transmission overspeed. The system operates in conjunction with a rotatable input member and an output member that is rotatable relative to the input member. A torque transfer device is operatively connected between the relatively rotatable input and output members. Specifically, a piston assembly is operated by an input control chamber that selectively receives pressurized hydraulic fluid which effects translation of the piston assembly to actuate the torque transfer device and thereby effect a driving connection between the relatively rotatable input and output members. The present system is adapted to control a hydrodynamic retarder assembly having a work cavity to receive hydraulic fluid. The retarder input valve assembly is supported from one of the relatively rotatable members selectively to deliver pressurized hydraulic fluid from the input control chamber to the retarder cavity. In order to achieve overspeed protection the retarder input valve opens in response to a predetermined angular velocity of the relatively rotatable member on which the retarder input valve assembly is supported. In a variation of the retarder control system explained above, a dump valve assembly is provided which opens selectively to release pressurized hydraulic fluid from the work cavity of said retarder in response to the pressure of the hydraulic fluid within said retarder work cavity.

12 Claims, 5 Drawing Sheets

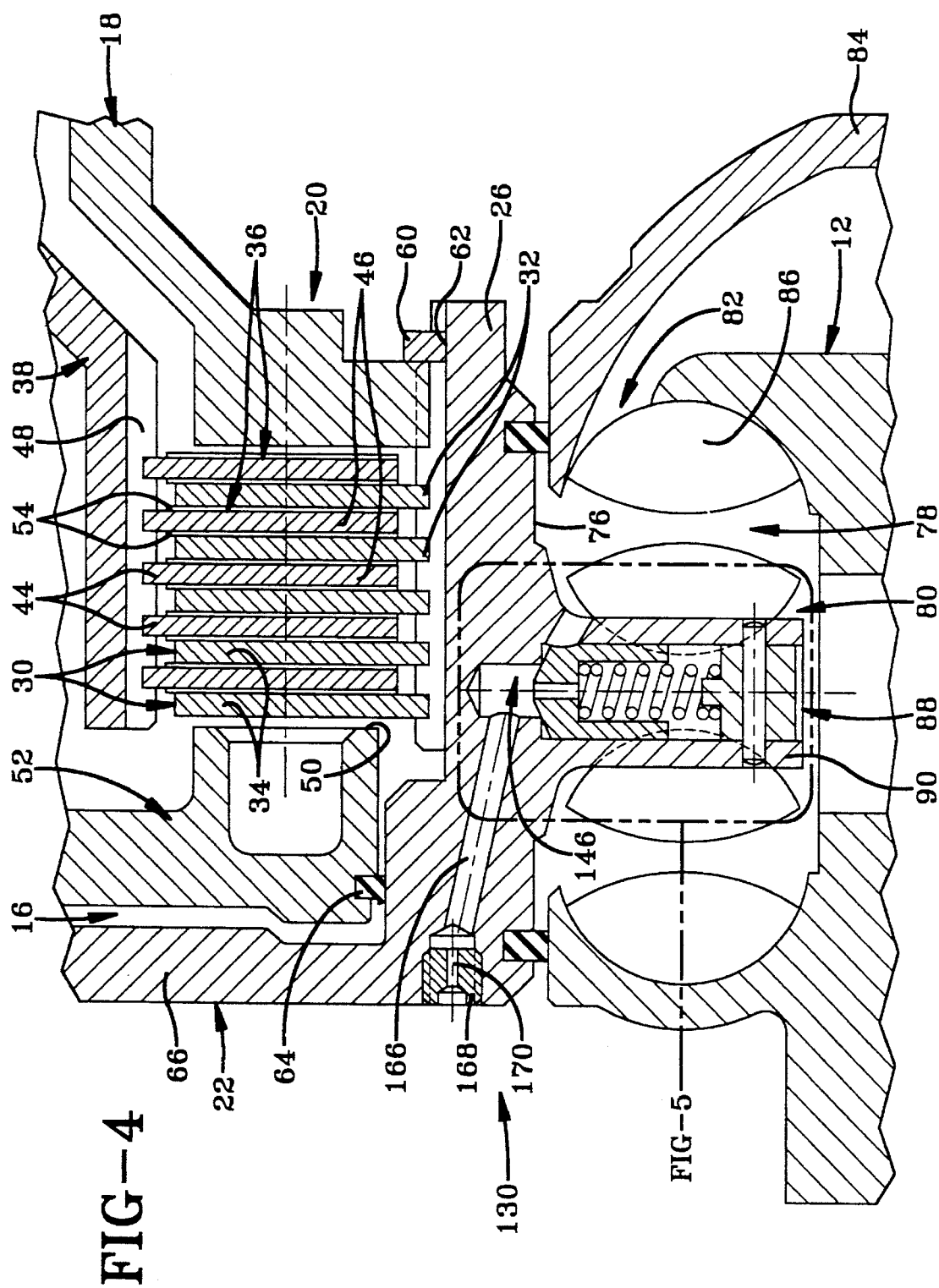

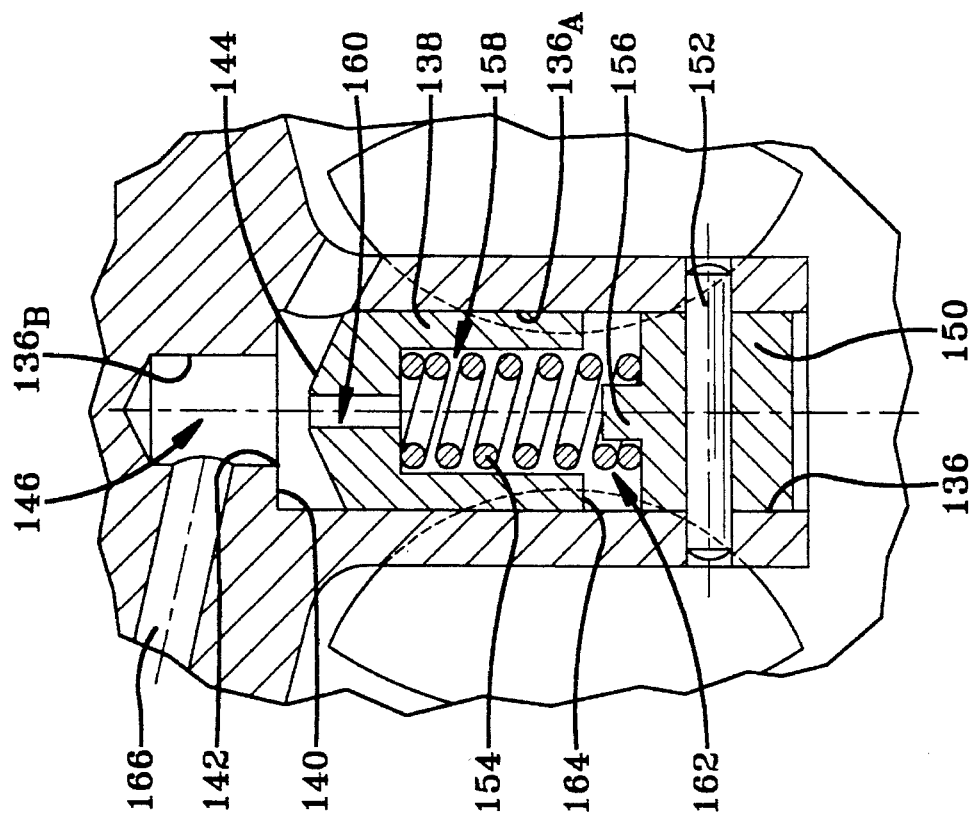
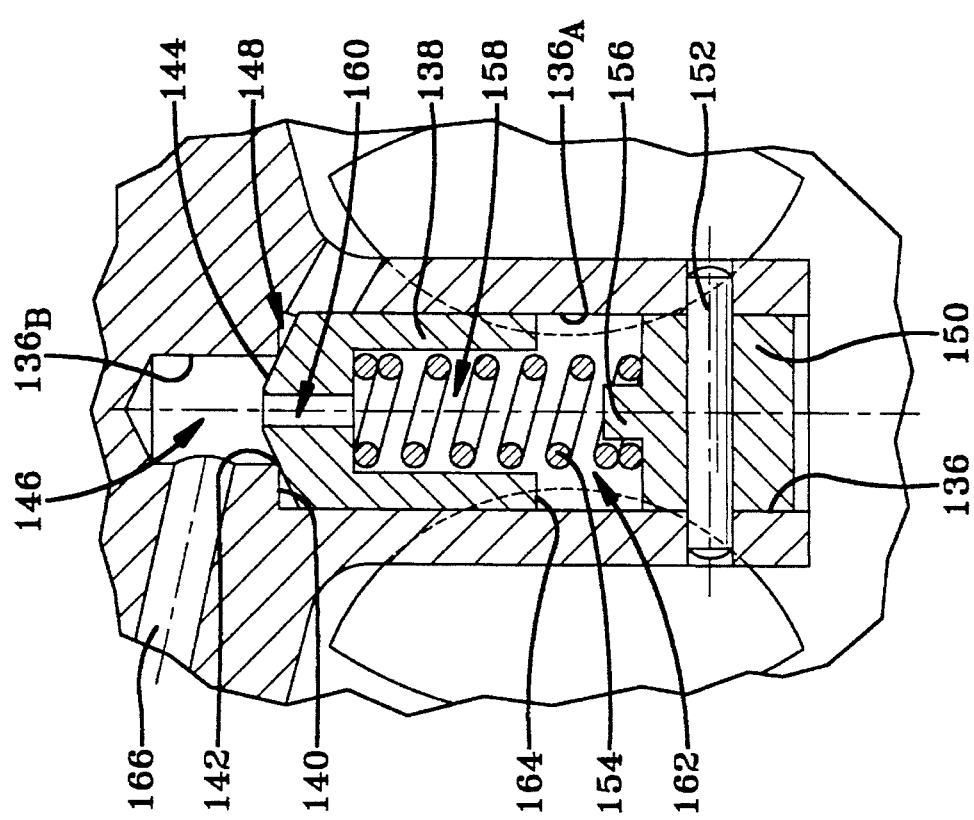

SYSTEM FOR TRANSMISSION OVERSPEED AND HORSEPOWER LIMIT PROTECTION

TECHNICAL FIELD

The present invention relates generally to vehicular transmission systems. More particularly, the present invention relates to retarders for vehicular transmission systems. Specifically, the present invention relates to an improved retarder control mechanism that provides transmission overspeed protection, and by virtue of a variation to the improved retarder control mechanism, also provides horsepower absorption limiting protection.

BACKGROUND OF THE INVENTION

Retarders are hydrodynamic brakes that utilize relative rotation of mechanical components within the hydraulic fluid present in the retarder to assist in slowing the vehicle in which the retarder is employed. Retarders are sometimes located in association with the output of the transmission and sometimes they are located in conjunction with the input to the transmission. Both locations have relative advantages and disadvantages, as is well known to this art. The present invention, however, is directed to the manner in which the operation of the retarder is controlled, and a mechanism embodying the concepts of the present invention is not dependent upon the relationship of the retarder to the transmission input or output.

Retarders have historically been employed in large vehicles to assist in vehicle braking or deceleration, particularly for the descent of steep hills in order to minimize extended usage of the vehicle brakes. The original retarders, or as they were then known, grade-retarding devices, were activated by moving the drive range selector lever to a "grade retarder range". In this position of the selector lever, all drive clutches were released, and to the surprise of the uninitiated driver, the grade retarder position of the selector lever would not afford any forward drive to the vehicle. It was truly a retard-only position.

Over the years, the operation and control of the retarder became quite sophisticated. The retarder itself typically constitutes a bladed rotor wheel that is operatively connected to the rotatable member for which rotation is to be selectively "retarded", and the rotor wheel is disposed adjacent to a bladed stator that is fixedly positioned. In the vehicular art, when a component is thus fixedly positioned, it is said to be "grounded" or "fixed to ground". The rotor and the stator are contained in, and generally conform to, a toroidal working chamber that is selectively filled with hydraulic fluid. The hydraulic interaction between the rotor and the stator effects the hydrodynamic braking action. As such, controlling the volume and pressure of the hydraulic fluid within the working chamber serves to regulate the operation of the retarder. Typically, the retarder is controlled by a series of valves that are opened and closed selectively to determine the flow of hydraulic fluid entering and exiting the toroidal working chamber.

In the current state of the art, automatic transmissions will only passively assist the function of the retarder when certain conditions are met. In particular, a dump valve may be hydraulically connected to the clutch housing so that when an excessive speed is reached, the pressure within the clutch housing will be relieved by releasing the oil contained therein through the dump valve to a sump or other hydraulic return system. Moreover, there is no prior art arrangement by which hydraulically to limit horsepower absorption in input retarders.

SUMMARY OF THE INVENTION

It is, therefore, a primary object of the present invention to provide a novel retarder control mechanism that operates in response to operation of the transmission system.

It is another object of the present invention to provide a retarder control mechanism, as above, that is actuated when the transmission system reaches a predetermined overspeed value.

It is a further object of the present invention to provide a retarder control mechanism, as above, that constitutes a simple, yet effective, means for actively interconnecting a retarder assembly with a transmission system so as to reduce the speed of the vehicle under predetermined conditions in as efficient and effective a manner as possible and thereby reduce the operator-applied braking force required to slow, or stop, a vehicle.

It is yet another object of the present invention to provide a retarder control mechanism, as above, that will achieve horsepower absorption limiting protection for the retarder.

It is a still further object of the present invention to provide a retarder control mechanism, as above, that permits the inclusion of a valve assembly that operatively rotates with the rotor arrangement of the retarder assembly to reduce the hydraulic pressure that operates the retarder in the event the desired horsepower absorption limits are exceeded.

These and other objects of the invention, as well as the advantages thereof over existing and prior art forms, which will be apparent in view of the following derailed specification, are accomplished by means hereinafter described and claimed.

In general, the present invention is directed to a retarder control system for protection against transmission overspeed. The system operates in conjunction with a rotatable input member and an output member that is rotatable relative to the input member. A torque transfer device is operatively connected between the relatively rotatable input and output members.

Specifically, a piston assembly is operated by an input control chamber that selectively receives pressurized hydraulic fluid which effects translation of the piston assembly to actuate the torque transfer device and thereby effect a driving connection between the relatively rotatable input and output members. The present system is adapted to control a hydrodynamic retarder assembly having a work cavity to receive hydraulic fluid. The retarder input valve assembly is supported from one of the relatively rotatable members selectively to deliver pressurized hydraulic fluid from the input control chamber to the retarder cavity. In order to achieve overspeed protection, the retarder input valve opens in response to a predetermined angular velocity of the relatively rotatable member on which the retarder input valve assembly is supported.

In a variation of the retarder control system described in the preceding paragraph, a dump valve assembly is provided which opens selectively to release pressurized hydraulic fluid from the work cavity of said retarder in response to the pressure of the hydraulic fluid within said retarder work cavity.

To acquaint persons skilled in the arts most closely related to the present invention, one preferred embodiment of a retarder control mechanism that illustrates a best mode now contemplated for putting the invention into practice is described herein by, and with reference to, the annexed drawings that form a part of the specification. The exemplary retarder control mechanism is described in detail without attempting to show all of the various forms and modifications in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

BRIEF DESCRIPTION OF THE DRAWINGS

FIG.4 is an enlarged portion of FIG. 1—the outline of the enlarged portion being delineated by the chain line identified as FIG. 4 on FIG. 1;

FIG. 5 is a further enlarged portion of FIG. 4—the outline of the enlarged portion being delineated by the chain line identified as FIG. 5—which focuses on the unique retarder dump valve assembly; and, FIG. 5 is a view similar to FIG. 5, but depicting the dump valve assembly which interconnects the retarder assembly to exhaust in its open state.

DESCRIPTION OF AN EXEMPLARY EMBODIMENT

Figure 1:
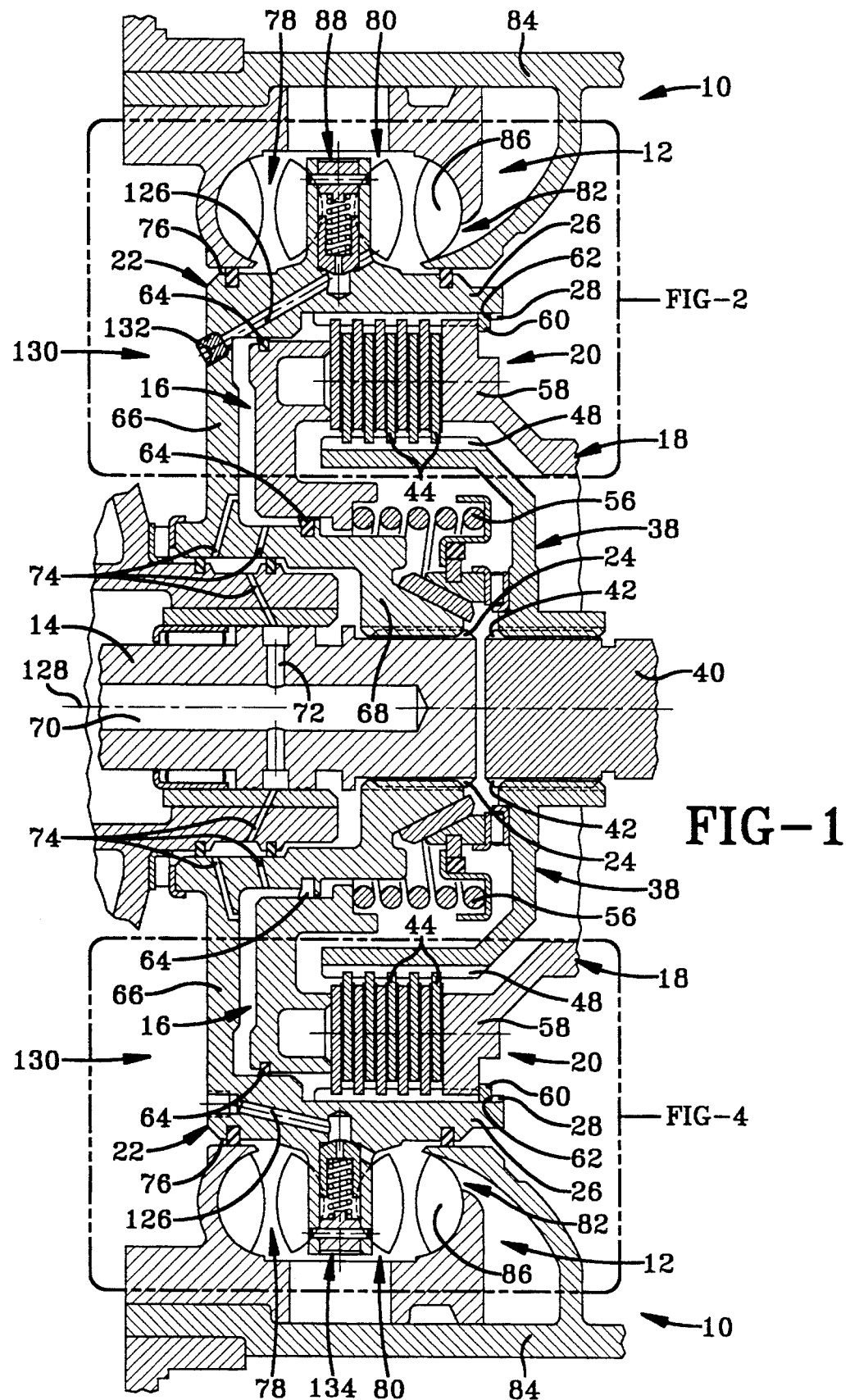
FIG. 1 is a diagrammatic cross sectional representation of a portion of a power transmission and an associated retarder assembly that incorporates a retarder control mechanism embodying the concepts of the present invention—the unique retarder input valve assembly which hydraulically interconnects the transmission and the retarder as well as the similar dump valve assembly which interconnects the retarder to exhaust are both shown in their closed state.
Figure 2:
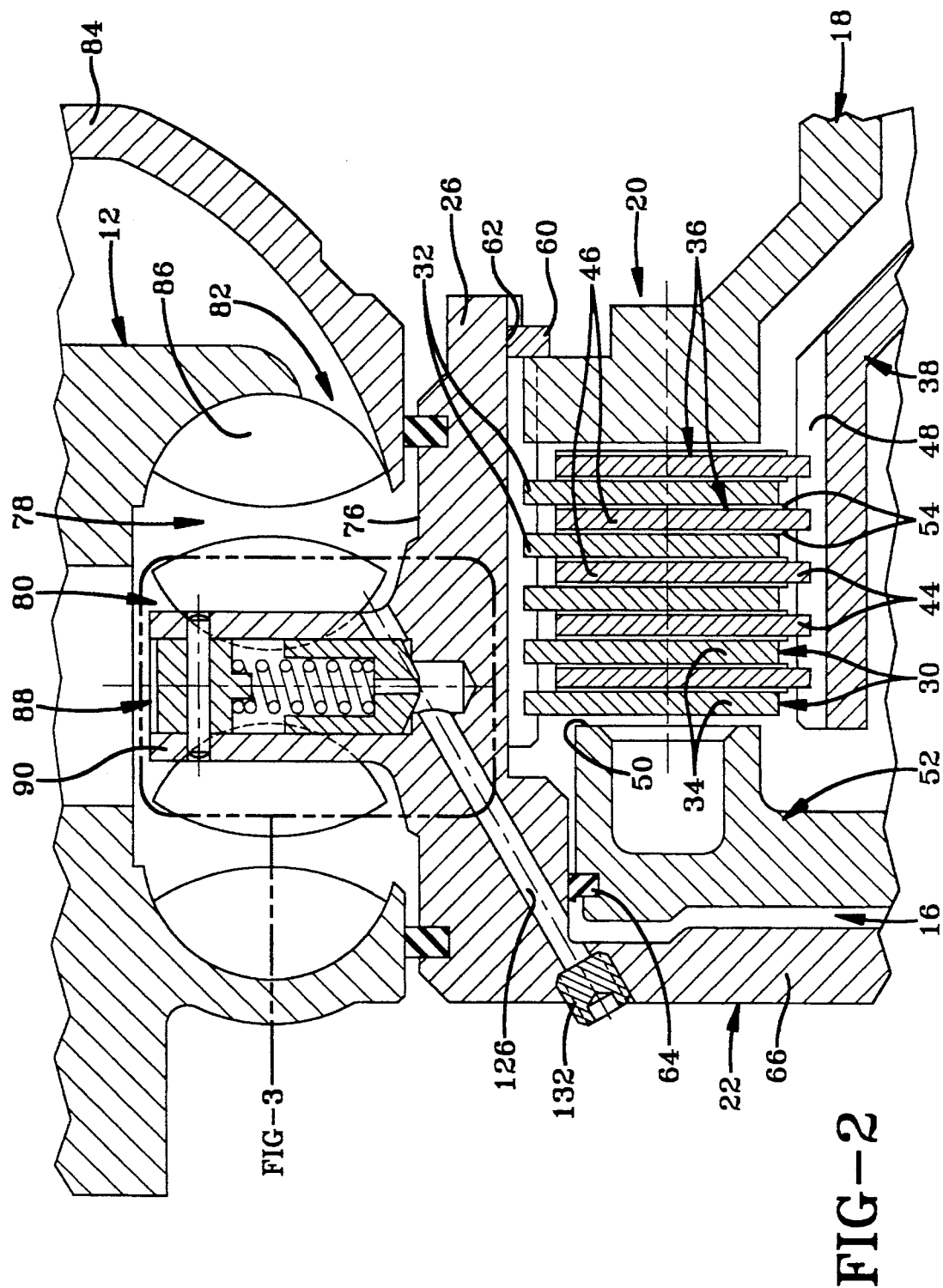
FIG. 2 is an enlarged portion of FIG. 1—the outline of the enlarged portion being delineated by the chain line identified as FIG-2 on FIG. 1.

Referring now to FIGS. 1 and 2 of the drawings, a retarder control mechanism embodying the concepts of the present invention is designated generally by the numeral 10. The retarder control mechanism 10 effects operation of a retarder assembly 12 in response to the rotational speed of the input shaft 14 and hydraulic pressure within the power input control chamber 16 of a vehicular transmission 18, as will be hereinafter described in detail.

The vehicular transmission 18 incorporates a power input torque transfer device 20 which serves as a clutch selectively to conjoin two relatively rotatable members. The first relatively rotatable member may be exemplified by the annular input ring 22 that is operatively secured, as by a spline connection 24, to rotate with an power input shaft 14. A radially outer annular skirt 26 is presented from the input ring 22, and the radially inner substantially cylindrical surface of the skirt 26 is provided with a plurality of circumferentially spaced axially extending splines 28. A plurality of first or apply torque plates 30 are nonrotatably secured to the input ring 22. As shown, a plurality of tangs 32 extend radially outwardly from the annular disk portion 34 of each first or apply torque plate 30 to engage the axially extending splines 28 on the skirt portion 26 of the input ring 22.

The first or apply torque plates 30 are interleaved with a plurality of second or reaction torque plates 36 which are nonrotatably secured to the second of the relatively rotatable members, which is exemplified by the output collar 38 that is affixed to the output shaft 40, as by a spline connection 42. The reaction torque plates 36 are secured to the output collar 38 as by a plurality of tangs 44 that extend radially inwardly from the annular disk portion 46 of each second or reaction torque plate 36 to engage the axially extending splines 48 on the output collar 38.

The head 50 of an annular piston assembly 52 selectively compresses the interleaved torque plates 30 and 36 against a plurality of friction disks 54 sandwiched between the respective first and second torque plates 30 and 36 in a well known manner. The piston assembly 52 is axially translatable against the biasing force of a spring 56 by hydraulic pressure within the power input control chamber 16. The interleaved torque plates 30 and 36 are selectively compressible against an annular reaction ring 58, the axial displacement of which—in a direction away from the interleaved torque plates 30 and 36—is restricted by a snap ring 60 received in a recess 62 on the radially inner side of the skirt 26. A plurality of seals 64 maintain the desired integrity of the control chamber 16 within the input ring 22.

The input ring 22 has an end wall 66 that extends radially between a stepped annular collar portion 68—a portion of which circumscribes the input shaft 14 and is attached thereto by the spline connection 24—and the skirt portion 26 thereof. The generally U-shaped configuration of the conjoined end wall 66, skirt portion 26 and collar portion 68 define the axially fixed surfaces of the power input control chamber 16. The annular piston assembly 52 has a U-shaped cross sectional configuration that is received within the power input control chamber 16 for axial displacement in response to pressure within the power input control chamber 16 sufficient to overcome the biasing action of the spring 56.

Pressurized hydraulic fluid may be selectively supplied to the power input control chamber 16 by a supply bore 70 that may extend axially within the input shaft 14 to communicate with one or more radial supply branches 72 that, in turn, communicate through the collar portion 68 of the input ring 22, and any additional structure, as by one or more feed passages 74.

Sealed to the outer surface 76 on the skirt 26 of the input ring 22 is the toroidal cavity 78 of the retarder assembly 12. A rotor assembly 80 may be integrally formed to extend radially outwardly from the outer surface 76 on the skirt 26, such that the rotor assembly 80 rotates in the retarder cavity 78 in conjunction with rotation of the input ring 22. As shown, a stator assembly 82 may be grounded to the transmission casing 84, such that the stator blades 86 are fixedly positioned within the retarder cavity 78.

One or more retarder input valve assemblies 88 may be incorporated within a fin 90 that extends radially outwardly from the outer surface 76 of the annular skirt portion 26 of the input ring 22. The rotor blades 92 may be secured to the laterally spaced exterior walls 94A and 94B of the radial fin 90, and a stepped cylindrical bore 96 may extend radially within the interior of the fin 90 for each retarder valve assembly 88 employed.

Figure 3A:
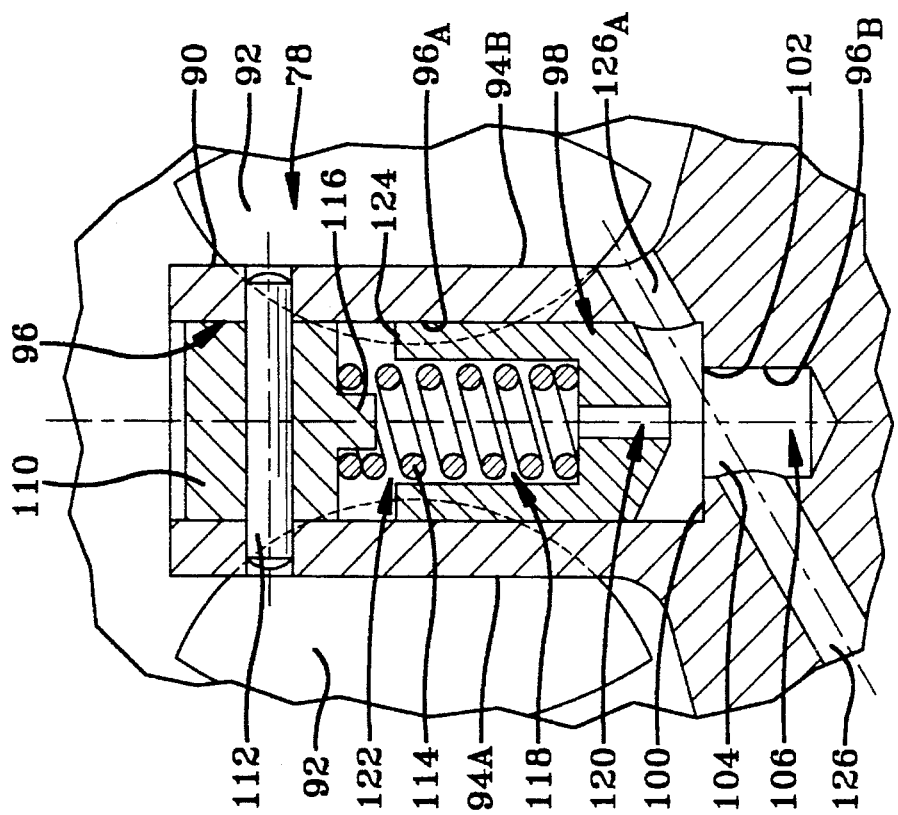
FIG. 3A is a view similar to FIG. 3, but depicting the unique valve assembly which interconnects the transmission and the retarder assembly in its open state.
Figure 3:
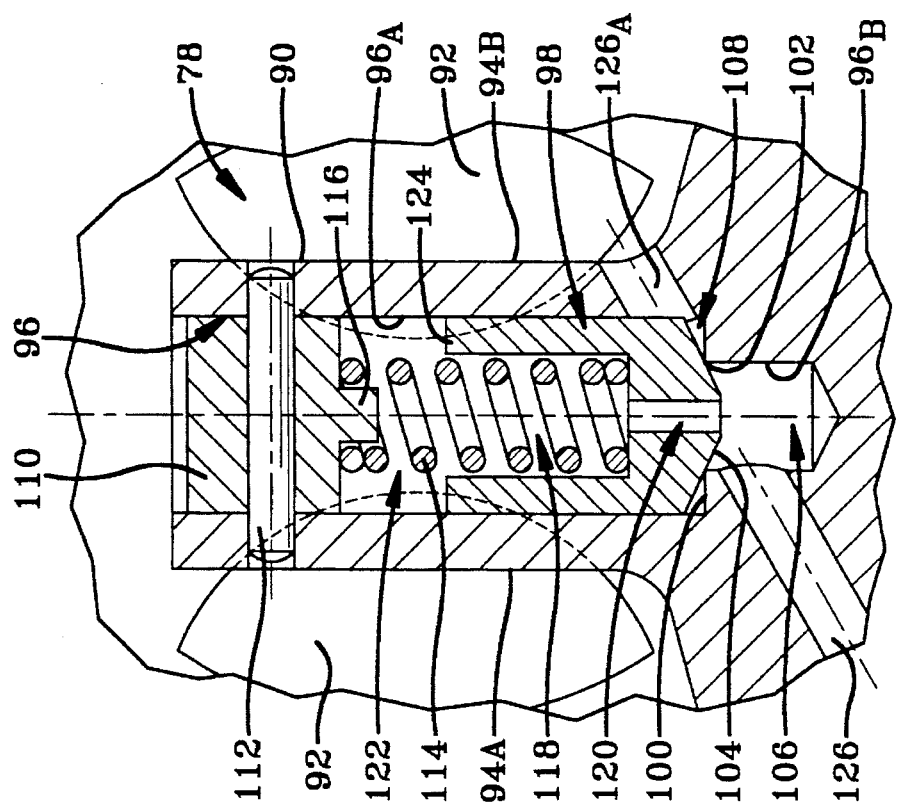
FIG. 3 is a further enlarged portion of FIG. 2—the outline of the enlarged portion being delineated by the chain line identified as FIG.3 on FIG. 2—which focuses on the unique retarder input valve assembly.

As best seen in FIG. 3, the radially outer portion $96_A$ of each stepped bore 96 slidingly receives a cylindrical valve member 98 for radial reciprocation. The radially inner portion $96_B$ of each stepped bore 96 is of lesser diameter than the radially outer portion $96_A$, and a transverse shoulder 100 delineates the juncture of the radially outer and radially inner portions $96_A$ and $96_B$, respectively, of the stepped bore 96. The edge of the shoulder 100 constitutes an annular valve seat 102 that is engageable by the medial portion of the generally conical head portion 104 of the valve member 98.

The radially inner portion $96_B$ of the bore 96 operates as a control subchamber 106 when the valve member 98 is in the closed position, as depicted in FIGS. 1 through 3. In addition, when the valve member 98 is in the closed position, that radial outer portion $96_A$ of the bore that remains exposed to the conical head portion 104 operates as a feedback control subchamber 108. The function of the control chamber and the feedback subchamber 106 and 108, respectively, will be hereinafter described in greater detail.

The stepped bore 96 may be closed to the retarder cavity 78 by a closure plug 110 that is received within the radially outer end of the bore 96 and secured in position by a retaining pin 112. A compression spring 114 is received over an aligning post 116 presented from the closure plug 110, and the spring 114 extends within a cylindrical cavity 118 disposed in registered opposition to the aligning post 116. The compression spring 114 acts to bias the conical head portion 104 of the valve member 98 against the seat 102 presented by the edge of the transverse shoulder 100.

A pressure balancing passage 120 extends axially of the valve member 98 to effect communication between the control subchamber 106 and the cylindrical cavity 118 within the valve member 98. The cavity 118, in turn, communicates with a balancing chamber 122 that is disposed between the closure plug 110 and the opposed end portion 124 of the valve member 98.

A transfer bore 126 (FIG. 2) communicates between the power input control chamber 16 and the control subchamber 106. To facilitate fabrication of the retarder control mechanism 10, the transfer bore 126 may, as shown, be disposed at an angular disposition with respect to the axis 128 of the input ring 22, such that the linear transfer bore 126 effects communication between the power input control chamber 16 and the control subchamber 106. That end of the transfer bore 126 which opens through the radial wall 66 of the input ring 22 into the main cavity 130 within the transmission casing 84 may be closed with a plug 132 to assure that the transfer bore 126 effects communication only between the power input control chamber 16 and the control subchamber 106.

To understand the operation of the retarder input valve assembly 88, it must be appreciated that the operator controls engine speed to achieve the desired vehicle speed, and that requires that the engine deliver the required torque to the input shaft 14. Movement of the vehicle also requires engagement of the power input torque transfer device 20 to achieve rotation of the transmission shaft 40. For the purpose of understanding the present invention, there is no need to show or describe how the transmission delivers torque through the sequential drive ratios to rotate the drive axles and thereby move the vehicle. The numerous arrangements available to achieve that result are well known to the art, and the present invention is not limited to any specific transmission arrangement. Thus, during operation of the vehicle at normal speeds, the transmission 18 will operate in a manner familiar to those skilled in the art.

For the present purposes, it need merely be understood that pressurized hydraulic fluid is delivered to the power input control chamber 16 in order to apply the torque transfer device 20. The fluid pressure within the power input control chamber 16 is transmitted to the control subchamber 106 through the transfer bore 126. From the control subchamber 106 the pressurized hydraulic fluid is also delivered into the balancing chamber 122 through the pressure balancing passage 120.

The hydraulic pressure within the balancing chamber 122 acts against the full cross sectional area of the valve member 98 to assist the biasing action of the compression spring 114 in driving the conical head portion 104 of the valve member 98 against the valve seat 102. Thus, the valve element 98 is seated by a combination of hydraulically and mechanically generated forces.

The aforesaid hydraulically and mechanically generated forces are opposed by the hydraulic pressure within control subchamber 106 which acts against that projected area of that portion of the conical head portion 104 which is exposed to—and thus equals—the cross sectional area of the control subchamber 106. The remaining projected area on the conical head portion 104 of the valve member 98 is acted upon by whatever pressure is supplied to the feedback subchamber 108 from the retarder cavity 78 through extension $126_A$ of the transfer bore 126.

During a typical forward drive operation of the vehicle the combined hydraulic and mechanical pressures applied to the valve member 98 will assure that the valve member 98 will remain in the closed state depicted in FIGS. 1 through 3.

However, as the angular velocity of the input shaft 14 increases beyond a predetermined value, the overspeed condition will cause the so-called centrifugal force exerted on the retarder valve member 98 to be greater than the opposing hydraulic and mechanical forces which serve to maintain the valve member 98 against the valve seat 102 during normal operation of the transmission 18. As a result, the retarder valve assembly 88 will then open— as illustrated in FIG. 3A. Once the retarder valve assembly 88 has opened, hydraulic fluid fed into the power input control chamber 16 will flow from the control subchamber 106 through the extension $126_A$ of the feed bore 126 and into the retarder cavity 78. This effects two distinct results.

First, as the pressure within the control chamber 16 is reduced, the torque transfer device 20 tends to disengage. This decoupling of the torque transfer device 20 itself tends to prevent additional overspeed. Concurrently, with the reduction of pressure in the control chamber 16, the pressure of the hydraulic fluid within the retarder cavity 78 increases, and the increased hydraulic pressure within the retarder cavity 78 effects a torque application against the rotor assembly 80 that opposes the torque applied by the input shaft 14. Thus, the retarder hydraulically resists rotation of the input ring 22 and thereby assures protection against overspeed of the input shaft 14. The resistance to the rotation of the input shaft 14 by the retarder assembly 12 decreases the aforesaid centrifugal force acting on the valve member 98, and when the valve member 98 returns to the closed position depicted in FIG. 3, rotation of the input shaft 14 will have returned to its normal operating condition.

While the aforesaid operation explains how a retarder control mechanism embodying the concepts of the present invention will serve to protect against overspeed, it does not explain how horsepower absorption is limited. That effect is achieved by employing a retarder dump valve assembly 134.

As depicted in FIGS. 1, 4 and 5, the dump valve assembly 134 is virtually identical to the retarder valve assembly 88, but with some rather significant operating differences achieved by some subtle distinctions in the hydraulic connections of the dump valve assembly 134 to the associated structure within which the dump valve 134 operates.

One or more of the dump valve assemblies 134 may also be incorporated within the fin 90 that extends radially outwardly from the outer surface 76 of the annular skirt portion 26 of the input ring 22. A stepped cylindrical bore 136 may extend radially within the interior of the fin 90 for each dump valve assembly 134 employed. The radially outer portion $136_A$ of each stepped bore 136 slidingly receives a cylindrical valve member 138 for radial reciprocation. The radially inner portion $136_B$ of each stepped bore 136 is of lesser diameter than the radially outer portion $136_A$, and a transverse shoulder 140 delineates the juncture of the radially outer and radially inner portions $136_A$ and $136_B$, respectively, of the stepped bore 136. The edge of the shoulder 140 constitutes an annular valve seat 142 that is engageable by the medial portion of the generally conical head portion 144 of the valve member 138.

The radially inner portion $136_B$ of the bore 136 operates as a return system dump chamber 146. In addition, when the valve member 138 is in the closed position, that radial outer portion $136_A$ of the stepped bore 136 that remains exposed to the conical head portion 144 of the valve member 138 operates as a return system exhaust subchamber 148. The function of the return system dump chamber 146 and the return system exhaust subchamber 148 will be hereinafter described in greater detail.

The stepped bore 136 may be closed to the retarder cavity 78 by a closure plug 150 that is received within the radially outer end of the bore 136 and secured in position by a retaining pin 152. A compression spring 154 is received over an aligning post 156 presented from the closure plug 150, and the spring 154 extends within a cylindrical cavity 158 disposed in registered opposition to the aligning post 156. The compression spring 154 acts to bias the head portion 144 of the valve member 138 against the seat 142 presented by the edge of the transverse shoulder 140.

A bleeder passage 160 extends axially of the valve member 138 to effect communication between the return system dump chamber 146 and the cylindrical cavity 158 within the valve member 138. The cavity 158, in turn, communicates with a balancing chamber 162 that is disposed between the closure plug 150 and the opposed end portion 164 of the valve member 138.

A transfer bore 166 communicates between the return system dump chamber 146 and the main cavity 130 of the transmission casing 84. That end of the transfer bore 166 which opens through the radial wall 66 of the input ring 22 into the main cavity 130 within the transmission casing 84 is preferably provided with a flow control plug 168. A flow restricting orifice 170 penetrates the plug 168 to control the rate at which hydraulic fluid can exit the transfer bore 166.

Because the pressure within the main cavity 130 of the transmission 18 is generally quite low, any pressure within the return system dump chamber 146 is transmitted through the transfer bore 166 to the main cavity 130 of the transmission 18. Similarly, the hydraulic fluid in the balancing chamber 162 is also delivered to the return system dump chamber 146, and then to the main cavity 130 in the transmission, through the bleeder passage 160.

The hydraulic pressure within the return system exhaust subchamber 148 is exceeded by the biasing action of the compression spring 154 to maintain the conical head portion 144 of the valve member 138 against the valve seat 142. Thus, the valve element 138 is seated by an opposed combination of hydraulically and mechanically generated forces, although the hydraulic force is, in this situation, likely to be of minimal value.

During a typical forward drive operation of the vehicle, the combined hydraulic and mechanical pressures applied to the valve member 138 will assure that the valve member 138 will remain in the closed state depicted in FIGS. 1, 4 and 5.

However, as the angular velocity of the rotor assembly 80 increases beyond a predetermined value, the overspeed condition will cause the centrifugal force exerted on the retarder valve member 138 to be greater than the opposing mechanical force which serves to maintain the valve member 138 against the valve seat 142 during normal operation of the transmission 18. As a result, the dump valve assembly 134 will then open—as illustrated in FIG. 5A. Once the dump valve assembly 134 has opened, hydraulic fluid within the retarder cavity 78 will flow from the retarder cavity 78 through the extension $166_A$, into the return system dump chamber 146 and along feed bore 166 to enter the main cavity 130 of the transmission 18 through the flow restricting orifice 170 in plug 168. As the pressure of the hydraulic fluid within the retarder cavity 78 decreases, the torque generation of the retarder is reduced, thereby limiting horsepower absorption by the retarder assembly 12. Such limitation on horsepower absorption prevents damage by overheating at high speeds, thereby increasing oil life and preventing a retarder or cooler system failure.

When the retarder rotor speed decreases, the aforesaid centrifugal force acting on the valve member 138 decreases and the valve member 138 returns to the closed position depicted in FIG. 4.

As previously discussed herein, when an overspeed condition is reached in a prior art retarder assembly, the hydraulic fluid contained therein would be dumped to a sump or return exhaust system thereby relieving pressure within the clutch housing to effect a passive reduction of the overspeed condition. As should now be apparent, the present invention not only teaches disengaging the rotating clutches when an overspeed condition arises, and redirecting oil from the clutch housing to actively apply torque to counter the turbine output shaft, but also permits the release of excess pressure within the retarder cavity to prevent retarder or cooler system failure.

While only one preferred overall embodiment of the present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

The embodiments of the invention in which an exclusive property or privilege is claimed are defined as follows:

1. A retarder control system for protection against transmission overspeed, said system comprising:

a rotatable input member;

an output member that is rotatable relative to said input member;

a torque transfer device operatively connected between said relatively rotatable input and output members;

a piston assembly;

an input control chamber selectively to receive pressurized hydraulic fluid and effect translation of said piston assembly to engage said torque transfer device and thereby effect a driving connection between said relatively rotatable input and output members;

a hydrodynamic retarder assembly having a work cavity to receive hydraulic fluid;

a retarder input valve assembly supported from one of said relatively rotatable members selectively to deliver pressurized hydraulic fluid from said input control chamber to said retarder cavity.

2. A retarder control system, as set forth in claim 1, wherein said retarder input assembly comprises:

a valve seat;

a valve member having a cylindrical body portion and a conical head portion;

said valve member translatable radially inwardly to effect engagement of said conical head portion against said valve seat and thereby close said valve assembly;

said valve member also translatable radially outwardly away from said valve seat to open said valve assembly;

means continually to bias said valve member radially inwardly against said valve seat;

said biasing means providing a force selected to permit said retarder input valve assembly to open in response to a predetermined angular velocity of the relatively rotatable member from which said retarder input valve is supported.

3. A retarder control system, as set forth in claim 2, wherein said biasing means comprises:

a compression spring mechanically to drive said valve member radially inwardly against said valve seat.

4. A retarder control system, as set forth in claim 3, further comprising:

a stepped bore;

a shoulder delineating the transition between the stepped portions of said bore;

a valve seat being defined by said shoulder;

that portion of said stepped bore located radially outwardly of said shoulder being of greater diameter than that portion of said stepped bore located radially inwardly of said shoulder;

said valve member being radially translatable within that portion of said stepped bore located radially outwardly of said shoulder.

5. A retarder control system, as set forth in claim 4, wherein:

that portion of said stepped bore located radially inwardly of said valve seat constitutes a control subchamber that is in continuous communication with said power input control chamber by a feed passage.

6. A retarder control system, as set forth in claim 5, further comprising:

a balancing chamber in said stepped bore;

said balancing chamber exposed against the radially outwardly exposed surface of said valve member;

a pressure balancing passage extending axially of said valve member to effect communication between said control subchamber and said balancing chamber.

7. A retarder control system, as set forth in claim 1, further comprising:

a dump valve assembly selectively to release pressurized hydraulic fluid from said work cavity in said retarder assembly.

8. A retarder control system, as set forth in claim 7, wherein said dump valve assembly comprises:

a valve seat;

a valve member having a cylindrical body portion and a conical head portion;

said valve member translatable radially inwardly to effect engagement of said conical head portion against said valve seat and thereby close said dump valve assembly;

said valve member also translatable radially outwardly away from said valve seat to open said dump valve assembly;

means continually to bias said valve member radially inwardly against said valve seat;

said biasing means providing a force selected to permit said dump valve assembly to open in response to a predetermined angular velocity of the relatively rotatable member from which said dump valve assembly is supported.

9. A retarder control system, as set forth in claim 8, wherein said biasing means comprises:

a compression spring mechanically to drive said valve member radially inwardly against said valve seat.

10. A retarder control system, as set forth in claim 9, further comprising:

a stepped bore;

a shoulder delineating the transition between the stepped portions of said bore;

a valve seat being defined by said shoulder;

that portion of said stepped bore located radially outwardly of said shoulder being of greater diameter than that portion of said stepped bore located radially inwardly of said shoulder;

said valve member being radially translatable within that portion of said stepped bore located radially outwardly of said shoulder.

11. A retarder control system, as set forth in claim 10, wherein:

that portion of said stepped bore located radially inwardly of said valve seat constitutes a return system dump chamber that is in continuous communication with a hydraulic return system by a transfer bore.

12. A retarder control system, as set forth in claim 11, further comprising:

a balancing chamber in said stepped bore;

said balancing chamber exposed against the radially outwardly exposed surface of said valve member;

a bleeder passage extending axially of said valve member to effect communication between said return system dump chamber and said balancing chamber.

* * * * *